United States Patent

Hale et al.

[11] Patent Number: 5,961,573
[45] Date of Patent: Oct. 5, 1999

[54] HEIGHT CONTROL OF AN AGRICULTURAL TOOL IN A SITE-SPECIFIC FARMING SYSTEM

[75] Inventors: George H. Hale, Naperville; Keith W. Wendte, Lemont; Abraham Orbach, Naperville, all of Ill.

[73] Assignee: Case Corporation, Racine, Wis.

[21] Appl. No.: 08/755,167

[22] Filed: Nov. 22, 1996

[51] Int. Cl.$^6$ .................................................. G06F 165/00
[52] U.S. Cl. ............................ 701/214; 701/50; 172/4.5; 172/9; 37/348
[58] Field of Search .......................... 701/1, 4, 50, 215, 701/214, 207, 213; 37/348; 172/4.5, 7, 9

[56] References Cited

U.S. PATENT DOCUMENTS

| Re. 35,100 | 11/1995 | Monson et al. . | |
|---|---|---|---|
| 4,306,732 | 12/1981 | Pettibone | 280/43.23 |
| 4,578,678 | 3/1986 | Hurd . | |
| 4,630,773 | 12/1986 | Ortlip . | |
| 4,675,676 | 6/1987 | Takanabe et al. . | |
| 4,736,303 | 4/1988 | Itoh et al. . | |
| 4,792,907 | 12/1988 | Ikeda et al. . | |
| 4,949,268 | 8/1990 | Nishikawa et al. . | |
| 5,065,326 | 11/1991 | Sahm | 701/50 |
| 5,084,822 | 1/1992 | Hayami . | |
| 5,214,757 | 5/1993 | Mauney et al. . | |
| 5,220,509 | 6/1993 | Takemura et al. . | |
| 5,282,389 | 2/1994 | Faivre et al. . | |
| 5,396,431 | 3/1995 | Shimizu et al. . | |
| 5,398,034 | 3/1995 | Spilker, Jr. . | |
| 5,416,712 | 5/1995 | Geier et al. . | |
| 5,421,416 | 6/1995 | Orbach et al. . | |
| 5,428,544 | 6/1995 | Shyu . | |
| 5,440,484 | 8/1995 | Kao . | |
| 5,452,211 | 9/1995 | Kyrtsos et al. . | |
| 5,455,769 | 10/1995 | Panoushek et al. . | |
| 5,461,803 | 10/1995 | Rocke | 701/50 |
| 5,467,271 | 11/1995 | Abel et al. . | |
| 5,469,158 | 11/1995 | Morita . | |

(List continued on next page.)

FOREIGN PATENT DOCUMENTS

| 0702891 A1 | 3/1996 | European Pat. Off. . |
|---|---|---|
| 0723740 A1 | 7/1996 | European Pat. Off. . |
| WO 86/05353 | 9/1986 | WIPO . |
| WO 97/40660 | 11/1997 | WIPO . |

OTHER PUBLICATIONS

Brochure: *Advanced Farming Systems*, © 1996 Case Corporation.

(List continued on next page.)

Primary Examiner—William A. Cuchlinski, Jr.
Assistant Examiner—Gertrude Arthur
Attorney, Agent, or Firm—Foley & Lardner

[57] ABSTRACT

A farming system which identifies the boundaries of agricultural fields and performs functions based upon whether a vehicle is located within a particular field is disclosed. The system includes a location signal generation circuit which receives positioning signals and generates location signals representative of the location of the vehicle. The system further includes a memory circuit which stores geo-referenced digital maps of the fields and may include boundary data or application maps for each field. The system further includes a control circuit which compares the location signals to the data stored in the memory circuit to determine when the vehicle is located in a particular field. In one embodiment, the control circuit selects a variable-rate application map for the particular field and generates variable-rate control signals from the map data which are applied to a variable-rate applicator. In another embodiment, the control circuit stores characteristic data sensed by a sensing circuit with correlated location signals in a geo-referenced digital map for the particular field. In another embodiment, the control circuit generates height control signals to raise and lower an agricultural tool such as a tractor plow or a combine header based upon relationships between the location of the tool in a field and the location of attributes in the field such as field boundaries or obstructions.

27 Claims, 7 Drawing Sheets

U.S. PATENT DOCUMENTS

| | | |
|---|---|---|
| 5,490,073 | 2/1996 | Kyrtsos . |
| 5,497,149 | 3/1996 | Fast . |
| 5,510,798 | 4/1996 | Bauer . |
| 5,517,419 | 5/1996 | Lanckton et al. . |
| 5,523,765 | 6/1996 | Ichikawa . |
| 5,525,998 | 6/1996 | Geier . |
| 5,526,002 | 6/1996 | Gudat et al. . |
| 5,526,291 | 6/1996 | Lennen . |
| 5,528,843 | 6/1996 | Rocke ........................................ 701/50 |

OTHER PUBLICATIONS

Brochure: *John Deere Greenstar Combine Yield–Mapping System*, John Deere.

Report No. 94–D–139, *Site Specific Yield Measurement in Combines and Forage Harvesting Machines,* Ageng—Milano '94.

The Use of GPS in Agriculture for Yield Mapping and Tractor Implement Guidance, DGPS '91 Symposium, vol. II, Seite 455–465.

*Yield Monitoring Experiences—1994*, ASE Winter Meeting, Atlanta, GA, Dec. 16, 1994.

Six–Ply Precision Layers of Computerized Information Allow Fine–Tuned Crop Productioin, Top Producer/Jan. 1995.

Farming with Satellites the Future of Farming?, FarmWeek, P. 3, Monday, Feb. 24, 1992.

Field Positioning Technology, Soybean Digest, HighTech Tools, pp. 23–25, Winter 1992.

Tools with Eyes, Farm Journal / Mid–Mar., 1989.

Data Acquisition for Yield Mapping with Combine Harvesters Computers in Agriculture, ASAE 1994.

Accuracy from Afar, Top Producer / Feb. 1992.

Accuracy to the Inch, Top Producer / Jan. 1995.

Sensing and Mapping Grain Yield Variation, Automated Agriculture for the $21^{st}$ Century, ASAE Pub. Nov. 1991.

Robotics and Intelligent Machines in Agriculture, ASAE—Proceedings—the First International Conference on Robotics . . .—Oct. 2–4, 1983.

*Control Concepts for Tillage Systems*—Robert L. Schafer—Dec. 1981.

*Control system for Combine Harvesters*—Report by Kotyk et al.

Brochure: *Introducing the Greenstar Combine Yield–Mapping System (What is the Greenstar Combine Yield–Mapping System?).*

Brochure: *Hiniker 8150 Control System—The Simple and Economical Solution to Accurate Chemical and Fertilizer Application.*

Brochure: *Hiniker 8200 Monitor—The Most Versailte Low Cost Acre Monitor on the Market.*

*Site Specific Farming's Second Wave*—Bryce Knorr; Mar. 1995.

3rd International Conference on *Lang Vehicle Navigation*—Prof. Dr. Kurt Biedonkopf; Jun. 14–16, 1994.

*Data Acquisition for Yield Mapping with Combine Harvesters*—P. Reitz and H.D. Kutzbach.

*Global Positioning System Applications*—Al Demmler; Apr. 1994.

*Where in the World?*—Ron Habour; AgMapping Jun. 1991.

| DATA POINT NO. | BU /ACRE | MOISTURE | LONGITUDE | LATITUDE | ... |
|---|---|---|---|---|---|
| 1 | 32.0739 | 17.7 | −88.7291520 | 39.0710720 | |
| 2 | 56.5808 | 18.1 | −88.7291140 | 39.0710720 | |
| 3 | 64.1104 | 17.1 | −88.7290720 | 39.0710740 | |
| 4 | 96.1741 | 16.4 | −88.7290320 | 39.0710760 | |
| 5 | 105.247 | 15.9 | −88.7289890 | 39.0710740 | |
| . | . | . | . | . | |
| . | . | . | . | . | |
| . | . | . | . | . | |

300

HEIGHT CONTROL OF AN AGRICULTURAL TOOL IN A SITE-SPECIFIC FARMING SYSTEM

FIELD OF THE INVENTION

The present invention relates to a system for controlling the height of an agricultural tool in a site-specific farming system. In particular, the invention relates to a system for controlling the height of an agricultural tool coupled to an agricultural vehicle based upon the relationship between the location of the tool and the location of an attribute of a field.

BACKGROUND OF THE INVENTION

Research within the agricultural community has shown that management of crop production may be optimized by taking into account spatial variations that often exist within a given farming field. For example, by varying the farming inputs applied to a field according to local conditions within the field, a farmer can optimize crop yield as a function of the inputs being applied while preventing or minimizing environmental damage. This management technique has become known as precision, site-specific, prescription or spatially-variable farming.

The management of a field using precision farming techniques requires the gathering and processing of data relating to site-specific characteristics of the field. Generally, site-specific input data is analyzed in real-time or off-line to generate a prescription map including desired application or control rates of a farming input. A control system reads data from the prescription map and generates a control signal which is applied to a variable-rate controller for applying a farming input to the field at a rate that varies as a function of the location. Variable-rate controllers may be mounted on agricultural vehicles with attached variable-rate applicators, and may be used to control application rates for applying seed, fertilizer, insecticide, herbicide or other inputs. The effect of the inputs may be analyzed by gathering site-specific yield and moisture content data and correlating this data with the farming inputs, thereby allowing a user to optimize the amounts and combinations of farming inputs applied to the field.

The spatially-variable characteristic data may be obtained by manual measuring, remote sensing, or sensing during field operations. Manual measurements typically involve taking a soil probe and analyzing the soil in a laboratory to determine nutrient data or soil condition data such as soil type or soil classification. Taking manual measurements, however, is labor intensive and, due to high sampling costs, provides only a limited number of data samples. Remote sensing may include taking aerial photographs or generating spectral images or maps from airborne or spaceborne multispectral sensors. Spectral data from remote sensing, however, is often difficult to correlate with a precise position in a field or with a specific quantifiable characteristic of the field. Both manual measurements and remote sensing require a user to conduct an airborne or ground-based survey of the field apart from normal field operations.

Spatially-variable characteristic data may also be acquired during normal field operations using appropriate sensors supported by a combine, tractor or other vehicle. A variety of characteristics may be sensed including soil properties (e.g., organic matter, fertility, nutrients, moisture content, compaction, topography or altitude), crop properties (e.g., height, moisture content or yield), and farming inputs applied to the field (e.g., fertilizers, herbicides, insecticides, seeds, cultural practices or tillage parameters and techniques used). Other spatially-variable characteristics may be manually sensed as a field is traversed (e.g., insect or weed infestation or landmarks). As these examples show, characteristics which correlate to a specific location include data related to local conditions of the field, farming inputs applied to the field, and crops harvested from the field.

Site-specific farming systems are typically used to perform functions such as those described above (e.g., yield mapping or variable-rate application). It would be desirable, however, to use components of a site-specific farming system to automate control functions of agricultural vehicles that are normally controlled manually. For example, the position of a hitch assembly coupled to a tractor is usually set by an operator with an input device such as a draft force or position command device, with a discrete input switch provided to allow the operator to manually raise and lower the hitch under certain conditions, such as when the hitch is raised when turning at a headland or driving between fields. The operator may also use the discrete input switch to raise the hitch to protect the attached implement from being damaged by obstructions (e.g. rocks or irrigation pipes) at or near the surface of a field. For another example, the position of a header supported by a combine is manually raised and lowered under certain conditions.

Accordingly, it would be desirable to automate these manually-controlled functions to decrease the workload of the operator and to increase system accuracy. For example, an operator may become fatigued or overloaded by the need to manually actuate a switch to raise and lower a hitch as a tractor turns repetitively at the headlands of a field. A portion of the field may not be worked when a hitch is not manually lowered in time to engage the ground at the start of the field, or a portion of the headland may be inadvertently worked if the hitch is not raised in time. A plow may be damaged if not raised above an obstruction (e.g., a rock, pipe, etc.) in the field because the operator was unaware of the location of the obstruction or because the operator forgot to raise the hitch.

SUMMARY OF THE INVENTION

Accordingly, the present invention automatically controls the height of an agricultural tool based upon the location of the tool in a field. Automatic control decreases operator workload and increases the accuracy compared with a system requiring manual raise and lower commands. The tool is raised and lowered based upon relationships between the location of the tool and the location of attributes associated with a field such as field boundaries or obstructions in the field (e.g., rocks, pipes). Attributes may be associated with a single field, or with multiple fields. A feedback sensor is included to provide closed-loop height control. An operator input may be used to control the rate of tool movement, and the movement may be controlled to anticipate reaching the location of an attribute such that the tool is already at a desired height when the tool reaches the location of the attribute.

One embodiment of the present invention provides a system for controlling the height of an agricultural tool coupled to an agricultural vehicle. The tool is moveable by a positioning assembly configured to raise and lower the tool in response to height control signals. The system includes a location signal generation circuit supported by the vehicle and configured to receive positioning signals and to generate location signals therefrom which are representative of the location of the tool, a memory circuit including geo-referenced attribute data representative of at least one attribute located in association with at least one agricultural field, and a control circuit coupled to the location signal generation circuit, the memory circuit and the positioning assembly. The control circuit is configured to compare the location signals to the geo-referenced attribute data and to generate the height control signals to change the height of the tool based upon the relationship between the location of the tool and the location of the at least one attribute.

Another embodiment of the present invention provides a system for controlling the height of an agricultural tool coupled to an agricultural vehicle. The tool is moveable by a positioning assembly configured to raise and lower the tool in response to height control signals. The system includes a location signal generation circuit supported by the vehicle and configured to receive positioning signals and to generate location signals therefrom which are representative of the location of the tool, a memory circuit including geo-referenced boundary data representative of the boundaries of at least one agricultural field, and a control circuit coupled to the location signal generation circuit, the memory circuit and the positioning assembly. The control circuit is configured to compare the location signals to the geo-referenced boundary data and to generate the height control signals to change the height of the tool based upon the relationship between the location of the tool and the boundaries of the at least one field.

Another embodiment of the present invention provides a system for controlling the height of an agricultural tool. The system includes an agricultural vehicle, a positioning assembly supported by the vehicle and configured to raise and lower the tool in response to height control signals, a location signal generation circuit supported by the vehicle and configured to receive positioning signals and to generate location signals therefrom which are representative of the location of the tool, a memory circuit including geo-referenced attribute data representative of at least one attribute located in association with at least one agricultural field, and a control circuit coupled to the location signal generation circuit, the memory circuit and the positioning assembly. The control circuit is configured to compare the location signals to the geo-referenced attribute data and to generate the height control signals to change the height of the tool based upon the relationship between the location of the tool and the location of the at least one attribute.

BRIEF DESCRIPTION OF THE DRAWINGS

The invention will become more fully understood from the following detailed description, taken in conjunction with the accompanying drawings, wherein like reference numerals refer to like parts, in which.

DETAILED DESCRIPTION OF THE PREFERRED EMBODIMENTS

Figure 1:
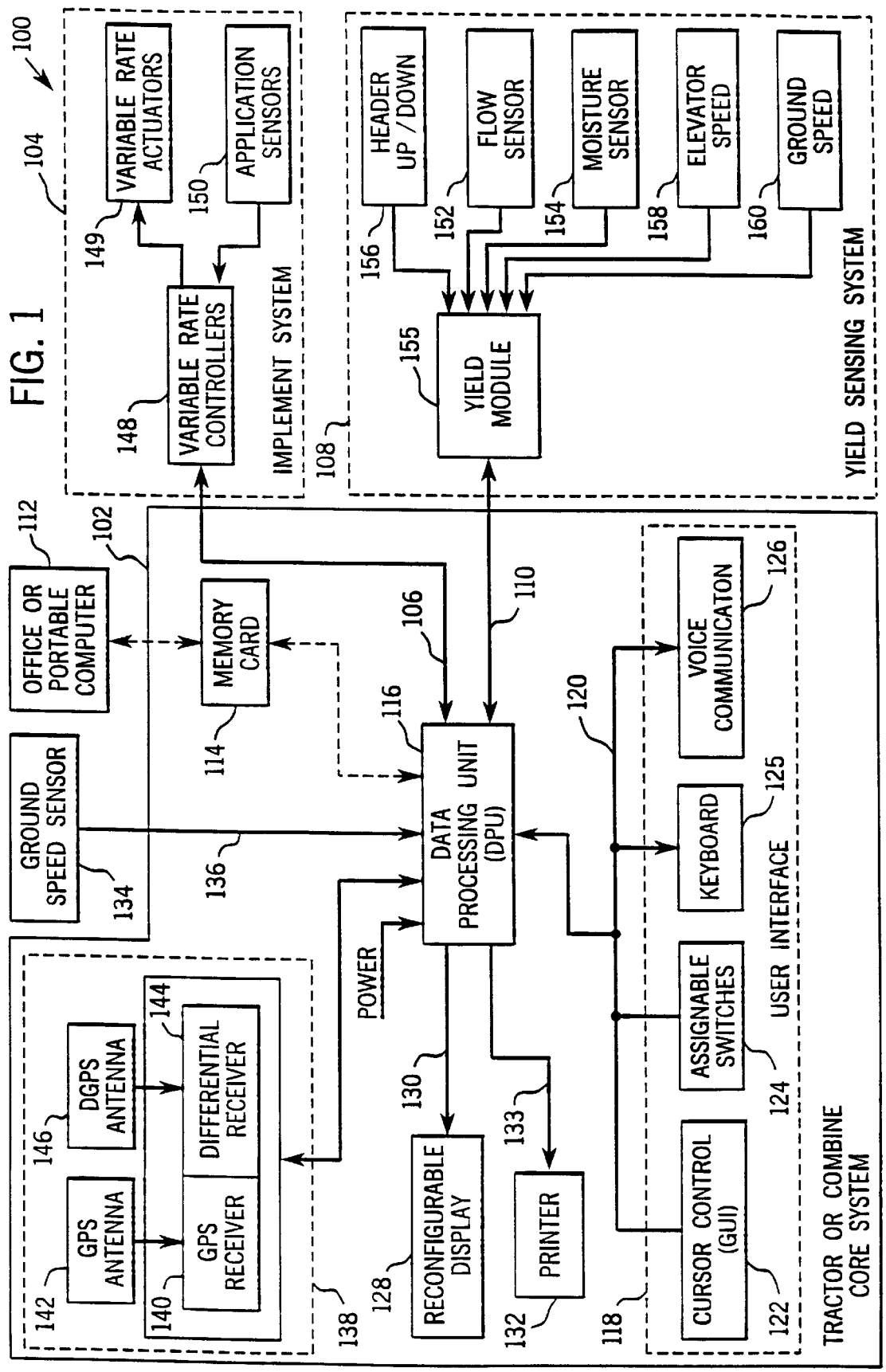
FIG. 1 is a block diagram illustrating a site-specific farming system including vehicles equipped with sensors for sampling site-specific characteristics of a field and electronic displays for displaying visible indicia of the characteristics in the vehicle cabs, and an office or portable computer.

Referring to FIG. 1, a site-specific farming system 100 includes one or more core systems 102 which provide data processing functions for different agricultural vehicles including tractors and combines. In farming system 100, each tractor or combine is equipped with its own core system 102. Each tractor is also equipped with an implement system 104 appropriate for the task at hand, and core system 102 of the tractor communicates with implement system 104 over bus 106. Similarly, each combine is also equipped with a yield sensing system 108, and core system 102 of the combine communicates with yield sensing system 108 over bus 110.

Preferably, core system 102 is removable and can be installed on a variety of agricultural vehicles. When installed on a tractor equipped with implement system 104, core system 102 can be configured to operate in an "apply" mode wherein it collects, controls, records and displays application rate data. The displayed data may include either the desired application rate data (e.g., the prescription map) or the actual application rate data (e.g., the sensed feedback). When installed on a combine equipped with yield sensing system 108, core system 102 can be configured to operate in a "harvest" mode wherein it collects, records and displays harvest data (e.g., yield or moisture content). Core system 102 may also operate in a "scout" mode wherein it records and displays indicia (i.e., graphic symbols) representative of data observed and entered by an operator. Core system 102 may also provide directional or positional assistance during scouting or when collecting soil samples. Sensing and control functions that require specialized input and output processing are performed outside core system 102.

Farming system 100 also includes a workstation or personal computer 112 which may be located in the farm office or may be portable. A medium of communication is used to transfer site-specific data between core system 102 and computer 112. Preferably, core system 102 and computer 112 each include a read/write interface (not shown) for a removable memory card 114 which can be transported between core system 102 and computer 112. Memory cards 114 may be Type II PCMCIA cards made by Centennial Technologies, Inc. However, other mediums of communication (e.g., floppy or hard disk, RF, infrared, RS-232/485 links, etc.) may be used. Memory card 114 is used to transfer site-specific characteristic data from core system 102 to computer 112, and to transfer prescription maps from computer 112 to core system 102.

Core system 102 includes a digital data processing unit (DPU) 116 which communicates with the vehicle operator through a user interface 118 via links 120 (e.g., an RS-232/485 interface; a standard keyboard interface). DPU 116 includes a processor (e.g., a 486DX or Pentium® microprocessor) and various types of memory which may include non-volatile memory (PROM, EEPROM or FLASH) and volatile memory (RAM). The processor executes a program stored in the non-volatile memory and the volatile memory (RAM) may include a battery back-up circuit. Alternatively, DPU 116 may be implemented using dedicated, specific purpose equipment or hard-wired logic circuitry. User interface 118 includes a graphical user interface (GUI) 122 providing cursor control (e.g., a mouse, joystick or four-way switch with up, down, right and left positions), assignable switches 124 (e.g., push buttons) configurable by the processor, a keyboard 125, and a voice-communication interface 126.

DPU 116 is configured to generate display signals which are applied to a reconfigurable display 128 (e.g., a CRT, flat screen LCD display) via communication link 130. Display 128 is preferably an active-matrix LCD capable of displaying full-motion video and a number of colors under varying ambient light conditions. Display 128 is also capable of displaying graphics and alpha-numeric characters. Display 128 is used, inter alia, to display the current configurations of assignable switches 124. DPU 116, user interface 118 and display 128 are located in the vehicle cab such that the operator has easy access to user interface 118 and an unobstructed or substantially unobstructed view of display 128. Core system 102 may also include a printer 132 in the cab which communicates with DPU 116 via an interface 133 (e.g., an RS-232 link).

DPU 116 receives signals representing the speed of the vehicle from ground speed sensor 134 via interface 136 (e.g., a frequency interface). Ground speed sensor 134 may include a magnetic pickup sensor configured to sense the speed of the vehicle's wheels or transmission, or may include a radar device mounted to the body of the vehicle. The speed signals may be used by DPU 116 to calculate distance travelled as described below.

DPU 116 also communicates with a location signal generation circuit 138 which generates location signals representing the vehicle's position. Circuit 138 includes a global positioning system (GPS) signal receiver 140 with an associated antenna 142, and a differential GPS (DGPS) signal receiver 144 with an associated antenna 146. A single antenna may be used in place of antennas 142 and 146. GPS receiver 140 may, for example, be manufactured by Trimble Navigation Ltd. of California, and DGPS receiver 144 may be manufactured by Satloc, Inc. of Arizona. GPS receiver 140 determines longitude and latitude coordinates (and altitude) of the vehicle from signals transmitted by the GPS satellite network. The accuracy of the position data is improved by applying correction signals received by DGPS receiver 144. The differential correction signals are used to correct errors present on GPS signals including the selective availability error signal added to GPS signals by the U.S. government. DGPS correction signals are transmitted by the U.S. Coast Guard and by commercial services. For example, the Omnistar DGPS system from John E. Chance & Assoc. of Texas includes a network of ten land-based differential reference stations which send correction signals to a master station which uploads signals to a satellite for broadcast throughout North America. GPS differential correction signals may also be transmitted from a local base station such as the top of a building. In a preferred embodiment, DPU 116 interfaces with the SATLOC L-Band Integrated TerraStar DGPS System via an RS-485 communication link.

When core system 102 is mounted on a tractor, DPU 116 communicates with implement system 104 via bus 106. Implement system 104 may include one or more variable-rate controllers 148, variable-rate actuators 149 and application sensors 150. DPU 116 reads application rate data for a particular field location from a prescription map (which may be supplied by computer 112), or reads an input device such as a potentiometer (not shown) used to manually set a desired application rate, and generates commands which are sent to variable-rate controllers 148. The command output rate is a function of the speed of the tractor and the desired application rate. For example, an increased speed will require an increased output rate to maintain a constant desired application rate. In response, controllers 148 generate control signals which are applied to variable-rate actuators 149. Application sensors 150 provide feedback signals representing the actual application rates to enable closed-loop control. Variable-rate application systems include, for example, a variable-rate planter controller from Rawson Control Systems of Iowa and a variable-rate fertilizer spreader from Soil Teq., Inc. of Minnesota. Bus 106 may be an RS-485 bus for a single-channel variable-rate controller, or a J-1939 implement bus for a multiple-channel controller.

The tractor may also include site-specific sensors configured to sense characteristics of a field during field operations and communicate the information to DPU 116, even if the tractor is not equipped with variable-rate controllers. For example, a tractor pulling a plow may be equipped with sensors for monitoring site-specific characteristics (e.g., draft force; implement position) as a field is worked. A tractor with a hitch assembly control system with various sensors is described in U.S. Pat. No. 5,421,416, commonly assigned and incorporated herein by reference. A tractor, as used herein, includes various agricultural vehicles attached to implements such as planters, spreaders or fertilizers.

Desired application rate signals from a prescription map, actual application rate signals from feedback sensors 150, or signals from another site-specific sensor supported by the tractor may be processed by DPU 116 to form data representative of the respective characteristic. This characteristic data may be correlated with location data representative of the location signals received from location signal generation circuit 138, and the correlated data stored in memory card 114 or in another memory.

When core system 102 is mounted on a combine, DPU 116 communicates with yield sensing system 108 via link 110, which may carry RS-232/485 signals. Yield sensing system 108 typically includes a yield flow sensor 152 and a moisture sensor 154. Yield flow sensor 152 may include an impact-type mass flow rate sensor attached to a steel plate which is struck by grain passing through the clean-grain elevator of the combine to measure the force of the grain flow. Moisture sensor 154 may be a capacitive-type sensor mounted on the underside of the grain tank loading auger of the combine to measure the moisture content of grain passing near the sensor. Moisture sensor 154 may include a grain temperature sensor to compensate the grain moisture signals for temperature. DPU 116 receives sensed signals from flow sensor 152 and moisture sensor 154, and receives location signals from location signal generation circuit 138 which represent the positions of the combine where grain flow and moisture content were sampled. The grain flow and moisture content signals are processed to form data representative of the respective characteristic, and this data is correlated with location data representative of the location signals. Correlated data is stored in memory card 114 or in another memory.

To convert the grain flow signals into yield data, the distance travelled by the combine is determined by multiplying the combine's speed by elapsed time. The speed may be based upon signals sensed by speed sensor 134, or may be determined by calculating the difference between successive position signals received from location signal generation circuit 138 and dividing by elapsed time. The yield (e.g., bu/acre) is determined by dividing the quantity of sensed grain (e.g., bu) by the area of the field harvested (e.g., acres), wherein the quantity of sensed grain is the product of the grain flow rate and time, and the area is the product of the width of cut and distance travelled.

In one embodiment, DPU 116 receives RS-485 serial communication signals from a yield module unit (YMU) 155 which is configured to perform data processing for yield sensing system 108. A separate YMU off-loads data processing functions from DPU 116, and minimizes wiring between the combine and the DPU. YMU 155 receives sensed signals from flow sensor 152, moisture sensor 154, a header up/down sensor 156, an elevator speed sensor 158 and a ground speed sensor 160. Header up/down sensor 156 senses the position of the combine's header to detect whether the combine is harvesting. When header position is above a pre-programmed value, YMU 155 assumes the combine is not harvesting and yield information is not calculated. A system for controlling and displaying the status of a combine header is described in U.S. Pat. No. 5,465,560, commonly assigned and incorporated herein by reference. Elevator speed sensor 158 senses the speed of the clean grain elevator to determine the speed at which grain passes through the elevator. Signals from sensor 158 may be used to compensate the yield calculations for the delay before harvested grain is sensed. Ground speed sensor 160 senses ground speed of the combine, and may be the same as ground speed sensor 134, or similar to it.

YMU 155 uses signals from sensors 152, 154, 156, 158 and 160 to calculate and communicate yield and moisture content data to DPU 116 via bus 110. The update rate at which data is communicated may be once per second. YMU 155 may provide instantaneous yield and moisture content data, and may also provide field and load total (summary) values for grain weight, wet and dry bushels, average moisture, area harvested and dry yield. Thus, YMU 155 allows specific yield processing functions to be moved from DPU 116. Alternatively, YMU 155 may send raw sensed data to DPU 116 and the DPU may perform the calculations. However, farming system 100 could also be configured such that DPU 116 reads the signals directly from the sensors.

Core system 102 may communicate with other vehicle systems over a vehicle data bus (not shown). Preferably, the vehicle data bus conforms to the standards of SAE J-1939 ("Recommended Practice for a Serial Control and Communications Vehicle Network"). A bridge circuit may be used to facilitate the transfer of data between the vehicle data bus and a secondary implement bus coupled to implement system 104 and DPU 116. The bridge circuit may be used to filter data between busses, thereby decreasing bus loading.

Figure 2:
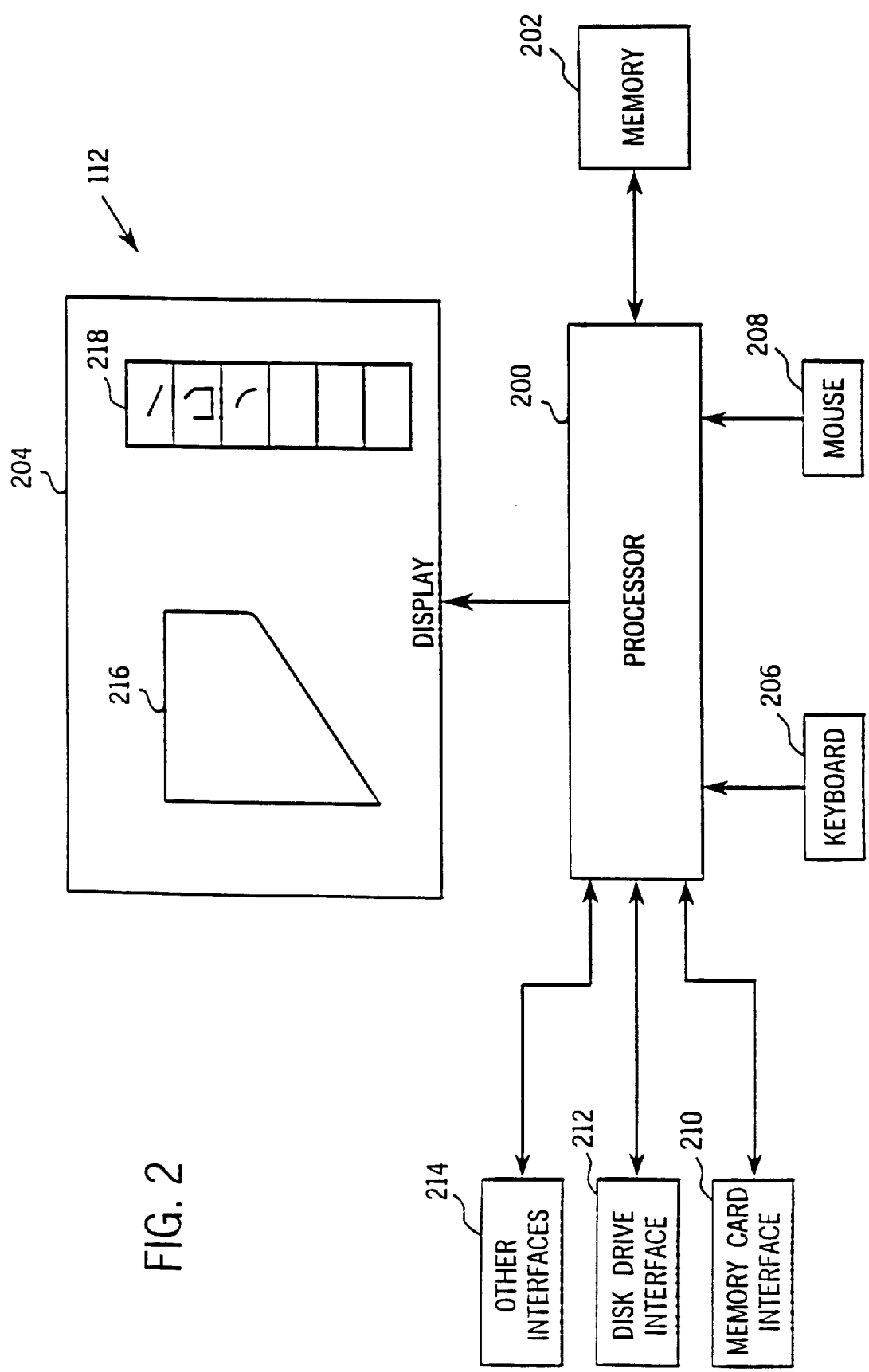
FIG. 2 is a block diagram of the office or portable computer shown in FIG. 1 which can be used to process site-specific farming data.

Referring to FIG. 2, computer 112 is preferably a programmed personal computer including a processor 200, a memory circuit 202, a color or monochrome display 204, input devices such as a keyboard 206 or a mouse 208, and input/output interfaces such as a memory card interface 210, a hard or floppy disk drive interface 212, and other interfaces 214 (e.g., RF or infrared). An input device such as a joystick, light pen or touch screen may also be used. Alternatively, computer 112 may be implemented using dedicated, specific-purpose equipment or hard-wired logic circuitry. Processor 200 may be an x86 or Pentium® microprocessor configured to execute a program stored in memory 202 or on a disk read by disk drive interface 212. Preferably, processor 200 reads precision farming data including position information from memory card 114 using memory card interface 210. Data may also be entered using keyboard 206, mouse 208, disk drive interface 212, or another interface 214.

Processor 200 generates display signals which, when applied to display 204, cause visual alpha-numeric and graphical indicia to be displayed. For example, the display signals may cause display 204 to create a visual map 216 of a field as well as icons 218 representing drawing tools in a toolbox. Preferably, display 204 is a color monitor, but it may also be a monochrome monitor capable of displaying different light intensity levels.

Figure 3:
FIG. 3 represents a layer of data representing a spatially-variable characteristic of a farming field stored in memory.

FIG. 3 generally represents the structure in which a layer of site-specific farming data representative of a characteristic of a farming field is stored in memory. The data structure may be referred to as a geo-referenced digital map, or a layer of data. The structure is preferably implemented using a database 300 (e.g., a geographical information system (GIS) database) represented by a table, wherein each row represents a characteristic data point taken at a location in the field. For example, a layer having 5000 data points is represented by a table having 5000 rows. Columns of information are associated with each data point. For example, the columns shown in FIG. 3 include yield data (bu/acre), moisture content data, and the longitude and latitude coordinates at which each data point was sampled. The data structure of FIG. 3 represents, for example, a yield layer. Data in the first row (Data Point No. 1) indicates that flow sensor 152 and moisture sensor 154 of the combine sensed grain flow corresponding to a yield of 32.0739 bu/acre and a moisture content of 17.7, respectively, at a location defined by longitude and latitude coordinates −88.7291520 and 39.0710720.

A similar structure may be used to store each layer of site-specific farming data. For example, a pH layer may include a row for each data point and columns for pH, longitude and latitude. Thus, memory card 114 may contain a layer of data for each site-specific characteristic of a field.

The data structure represented generally by FIG. 3 may include additional columns representing other spatially-variable data. For example, a harvest data structure may include the following fields:

| Data Item | Description |
| --- | --- |
| Longitude | Longitude position of data from GPS |
| Latitude | Latitude position of data from GPS |
| Flow Rate | Weight (wet) of grain passing by flow sensor 152 every second (e.g., lbs/sec) |
| Moisture | Percent (%) of grain weight which is moisture |
| GPS Time | Time stamp from GPS (sec) |
| Cycles | Seconds covered by the data (e.g., 1, 2 or 3) |
| Distance | Distance (inches) traveled since last data point |
| Swath | Width of cut of the header (inches) |
| Header Pos | 1 = header down; 0 = header up |
| Pass | Number of the pass through a field |
| Grain | Type of grain (e.g., corn) |
| GPS Status | 1 = good (>= 4 satellites); 2 = marginal (3 satellites); 3 = bad (<= 2 satellites) |
| Altitude | Altitude (feet) of data from GPS |

The data structure may also include heading information such as a vehicle identifier, a farm identifier, a field identifier, a load identifier, and a serial number for hardware components of farming system 100 (e.g., a yield module serial number). A similar data structure may be used to store application data. The harvest and application data structures are preferably stored as DOS files in memory card 114.

DPU 116 and processor 200 use correlated characteristic and location farming data to perform various functions of site-specific farming system 100. For example, DPU 116 or processor 200 use the correlated farming data to generate display signals which cause electronic display 128 or 204, respectively, to plot a map of a field which includes visible indicia of the characteristic data. DPU 116 typically plots the map in real-time as characteristic and location signals are received from the sensing circuits (e.g., flow sensor 152, moisture sensor 154, application sensors 150) and location signal generation circuit 138, respectively. However, DPU 116 may also plot a map off-line based upon farming data previously stored in memory. For example, if a harvest operation was stopped in mid-field on a previous day, DPU 116 may generate a yield map based on the previous day's yield data and continue plotting data on the yield map that is collected during the current day's operation. In contrast, processor 200 typically plots the map off-line based upon farming data received from memory card 114.

Figure 4:
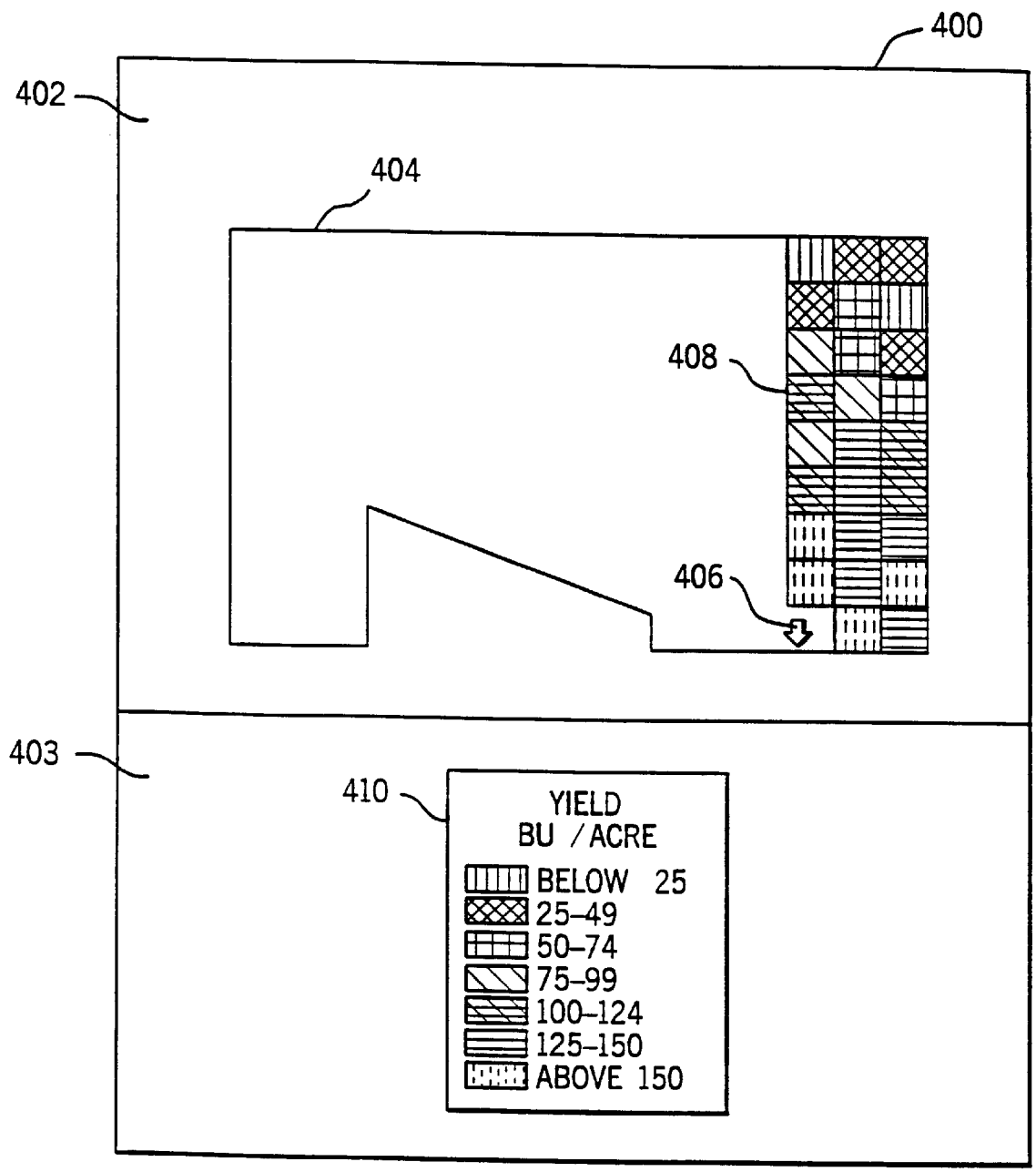
FIG. 4 shows a map of a farming field displayed on an electronic display in a vehicle cab which includes visible indicia of a characteristic of the field.

FIG. 4 represents an exemplary display when core system 102 is mounted on a combine equipped with flow sensor 152 and moisture sensor 154, the combine is harvesting grain, and DPU 116 is using the sensed data and correlated location data in real-time to plot a map of the field which includes visible indicia of the yield. A screen 400 of display 128 includes a map display area 402 and a legend display area 403. In this example, the boundaries of the field being harvested are defined and are stored in memory. After entering a "harvest" mode of operation in response to actuation of one of assignable switches 124, DPU 116 accesses the longitude and latitude coordinates of the field boundaries from memory and scales the field boundaries to correspond to a portion of map display area 402. DPU 116 scales the boundary data and produces display signals which, when applied to display 128, generate a visible map 404 of the field boundaries within map display area 402.

At the start of the harvest, the combine was located at the upper-right hand corner of map 404. The combine then made a number of passes through the field, turning at the headlands (located at the boundaries of map 404). The current location of the combine is marked by an icon 406, such as an arrow which also indicates the direction of travel. The three columns of blocks indicate that the combine has made three passes through the field. Throughout the harvest, DPU 116 gathers site-specific data sensed by flow sensor 152 and moisture sensor 154 and correlates the sensed data with the locations at which the sensed data was sampled using signals from location signal generation circuit 138. The data may be sampled, for example, at 1 second intervals. The correlated data is stored in memory (e.g., memory card 114) for later analysis by office computer 112. DPU 116 may be configured to not calculate yield data based upon an indication that the combine is not harvesting (e.g., header position is above a threshold position). This indication may also be used to separate passes through the field.

To accurately correlate the location data with the sensed characteristic data, DPU 116 is preferably programmed with variables, which may be set by the operator, which indicate the distance and direction between GPS antenna 142 and the sampled location of the field (i.e., between antenna 142 and the combine's header or the tractor's implement). This information is used as an offset to correct the location data stored with the sensed data. Also, to compensate for the time required for grain entering the header of the combine to reach the flow sensor 152, DPU 116 is programmed with a delay value (e.g., 10 seconds). Sensed data is correlated with the location data received 10 seconds earlier. Thus, no data will be sensed and no data will be plotted until 10 seconds after harvesting starts. In one embodiment, DPU 116 maintains a buffer of the last 20 positions received, and selects a position to use based upon the delay value.

The characteristic data and correlated location data are used to produce a display signal in real-time which, when applied to display 128, generates visible indicia of the characteristic data at corresponding locations of map 404. DPU 116 gathers characteristic data over "square" areas of the field where the sides of the square are substantially equal to the width of cut of the combine (or the width of the implement). Other shapes or blocks could also be used such as rectangles where the width is equal to the width of cut and the length is equal to the distance traversed in a predetermined time interval. Data within each data block is automatically processed or filtered (e.g., averaged) before being displayed. Averaging data as it is plotted eliminates the need to plot every data point, thereby decreasing visual noise on display 128. If desired, data representative of the blocks could be stored in memory rather than the raw data to reduce the memory storage and subsequent processing requirements. The average value of the data in each data block, and location data associated with the data block (appropriately scaled), are used to produce the display signal applied to display 128. In response, display 128 generates visible data blocks 408 which include visible indicia of the average characteristic value at corresponding locations of map 404.

Characteristic data may be visually represented on display 128 in several ways. In a preferred embodiment, distinguishable colors represent different ranges of the average data in each visible data block. For example, the colors red, orange, yellow, green, cyan, blue and violet may represent increasing ranges of average yield. Legend 410 displays each color and its associated yield range: below 25 (red); 25–49 (orange); 50–74 (yellow); 75–99 (green); 100–124 (cyan); 125–150 (blue); and above 150 bu/acre of corn (violet). When a moisture map is displayed, the default colors and ranges are: 0–7% (red); 7–14% (orange); 14–21% (yellow); 21–28% (green); 29–35% (cyan); 35–42% (blue); and above 42% (violet). The ranges and colors could also be selectable by the user. The range represented by each color is represented by legend 410 displayed within legend display area 403.

In one embodiment, the user selects an average value of the characteristic for the field and the ranges are based on the average value, with green centered at the average. For example, each color may represent a yield range of 5 bu/acre if the selected average yield is 50 bu/acre or less, a range of 10 bu/acre if the selected average yield is 50 to 125 bu/acre, or a range of 15 bu/acre if the selected average yield is 125 bu/acre or more. In each case, the range limits are rounded to the next whole number (e.g., green=48–53 bu/acre for a selected average yield of 50 bu/acre), and out of range values are displayed using the appropriate end color (i.e., red or violet). Alternatively, ranges may be represented by alpha-numeric characters or by different light intensity levels or grey scales.

Once geo-referenced digital maps of a field have been stored in memory (e.g., memory card 114) as described above, DPU 116 or processor 200 may read the correlated farming data from the memory and cause a map to be plotted off-line on display 128 or 204, respectively. The map includes representations of the characteristic data. The map is generated in a manner similar to the manner in which DPU 116 generates a map in real-time, except that the real-time position of the vehicle is not shown on the map, and the data may be plotted in any sequence and in any time-frame.

The correlated farming data may also be used to perform functions such as generating prescription maps or variable-rate application signals. For example, if the farming data indicates that areas of a field have varying nutrient concentration levels, processor 200 could generate a fertilizer prescription map which includes relatively high application rates for areas of the field with low nutrient levels and relatively low application rates for areas of the field with high nutrient levels. This prescription map would balance the need to adequately fertilize the field while minimizing the amount of fertilizer applied. The prescription map could be provided to DPU 116 via memory card 114, and DPU 116 could generate commands based upon the map data and apply the commands to variable-rate controllers 148.

Site-specific farming system 100 includes functions which facilitate use on more than one farm, or on a single farm having more than one field. These functions allow site-specific farming data associated with each field to be maintained independently of farming data associated with any other field. These functions also simplify the tasks which are performed by the system operator.

Figure 5:
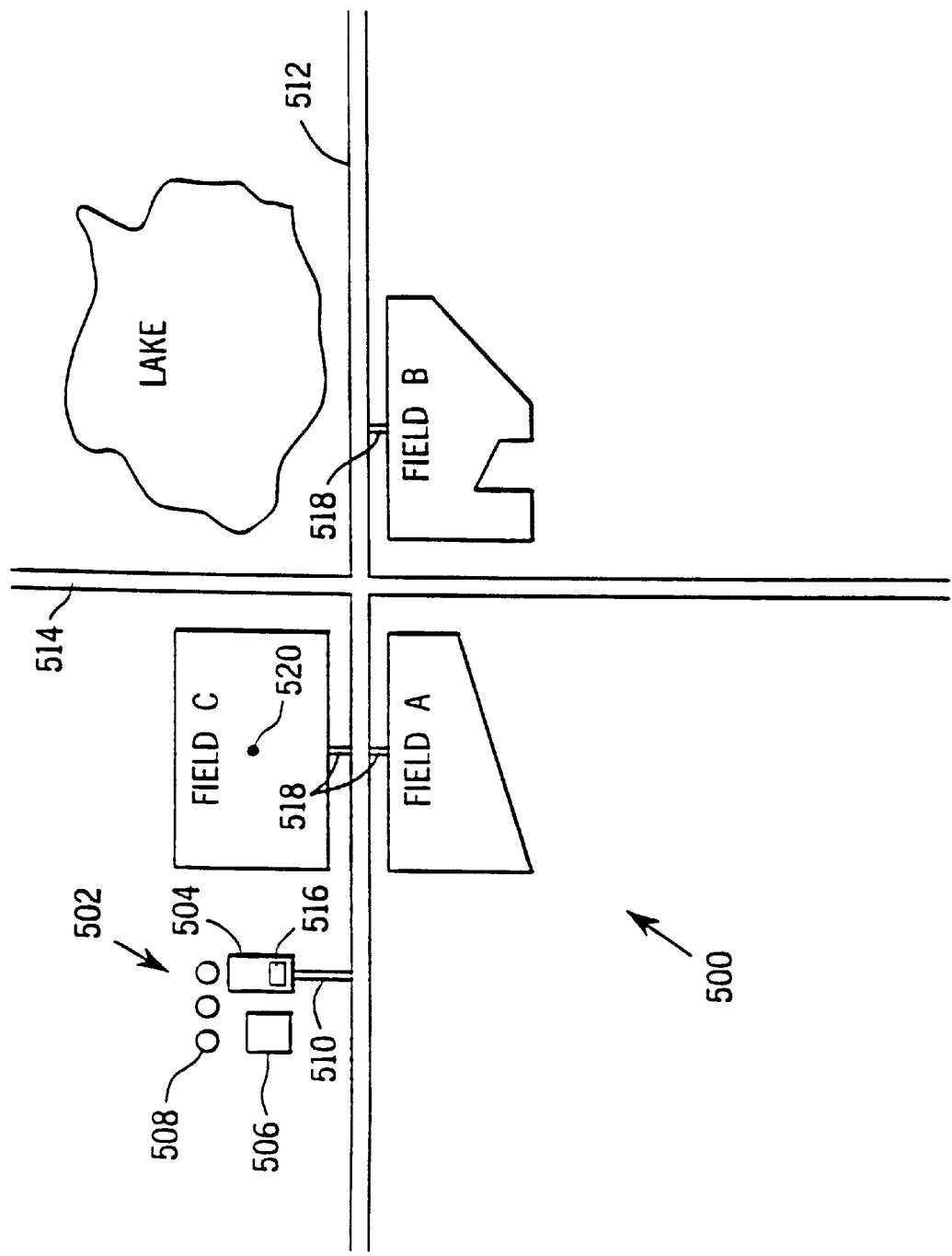
FIG. 5 shows an exemplary map of a farm including a farmstead, roads, three fields (A, B and C), a lake, and a rock located in field C.

Referring to FIG. 5, an exemplary farm 500 is used to explain the structure and operation of site-specific farming system 100 in a multiple-field environment. Farm 500 includes a farmstead 502 with buildings 504 and 506 and grain silos 508. Building 504 is a barn and building 506 is a farmhouse including a farm office. A driveway 510 connects building 504 with an east-west road 512, which intersects a north-south road 514. Roads 512 and 514 divide farm 500 into quadrants containing a first field A, a second field B, a third field C and a lake. Roads 512 and 514 provide access to fields A, B and C for an agricultural vehicle 516 garaged in barn 504. Access ways 518 provide access from the roads to the fields. Vehicle 516 may be, for example, a tractor or a combine. A rock near or at the surface of field C is represented at reference numeral 520. Farming system 100 may, of course, be used on farms with different layouts.

Figure 6:
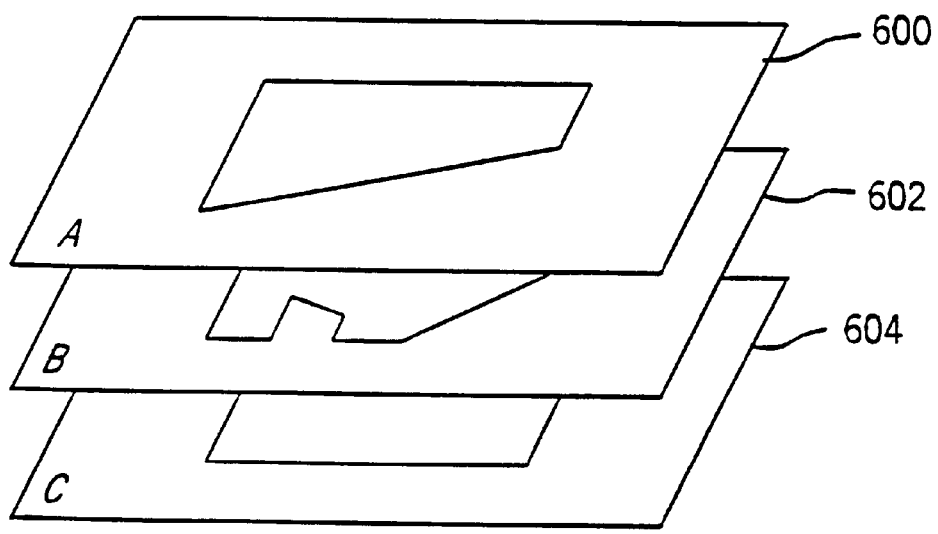
FIG. 6 represents three layers or geo-referenced maps which include boundary data representative of the boundaries of each of the three fields (A, B and C) shown in FIG. 5.

Referring to FIG. 6, the boundaries of fields A, B and C are determined and stored in geo-referenced boundary maps 600, 602 and 604, respectively. The maps are stored as separate layers or files in memory card 114 or in another memory. The boundary data for the maps may be determined in several ways. For example, a map-drawing program may be executed on computer 112, and drawing tools 218 used to facilitate the creation of the maps. For another example, a hardcopy map of farm 500 may be digitized and stored in memory, or aerial photographs of the farm may be registered to create digital maps. For another example, an agricultural vehicle equipped with farming system 100 may be driven around farm 500 in a scouting mode of operation while an operator enters visual attributes of the farm (e.g., field boundaries, rocks, lakes, etc.) while the location signals received by location signal generation circuit 138 are correlated with the visual attributes. Maps 600, 602 and 604 include boundary data representative of the boundaries with correlated location data representative of the locations in the respective field at which the boundaries are located.

As agricultural vehicle 516 equipped with core system 102 is driven about farm 500, DPU 116 compares location signals generated by location signal generation circuit 138 to the boundaries of each field to determine when the vehicle is located within a particular field and, if so, which field the vehicle is located within. For example, assume that memory card 114 was programmed with boundary data representative of the boundaries of fields A, B and C and that vehicle 516 is driven from barn 504 into field B. When vehicle 516 is still in barn 504, on driveway 510, on road 512 and on access 518 leading to field B, comparisons of the location signals to the boundary data show that vehicle 516 is not within the boundaries of any field. However, as vehicle 516 enters field B, comparisons of the location signals to boundary map 602, which represents the boundaries of field B, show that vehicle 516 has entered field B.

Figure 7:
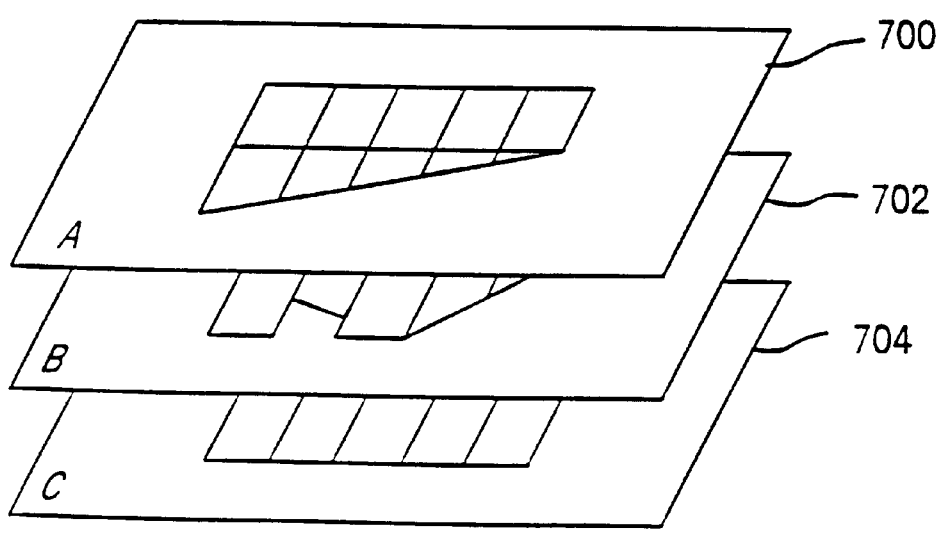
FIG. 7 represents three geo-referenced prescription maps which include variable-rate application data for each of the three fields (A, B and C) shown in FIG. 5.

The operation of site-specific farming system 100 after entering a field depends upon the particular task being performed. For example, a tractor equipped with implement system 104 may start application of a farming input at a variable-rate after identifying the field. Application data may be determined by computer 112 and transferred to DPU 116 in the form of prescription maps stored in memory card 114. For example, referring to FIG. 7, prescription or variable-rate application data for fields A, B and C are stored in geo-referenced maps 700, 702 and 704, respectively. In one embodiment, each field was divided by computer 112 into regions represented by grids on maps 700, 702 and 704. An application rate is determined based upon other site-specific farming data and is stored in association with each region. Maps 700, 702 and 704 include application rate data representative of desired application rates for a number of locations in the respective field correlated with location data representative of the locations at which the desired rate will be applied. As vehicle 516 enters field B, DPU 116 selects variable-rate application map 702 since the vehicle is located within field B. The location signals are used to index the application rates associated with the locations in the field.

Application sensors 150 generate feedback signals representative of the actual amount of the farming input applied. The feedback signals may, for example, indicate the actual number of seeds being planted or the actual amount of fertilizer being applied. DPU 116 may use the feedback signals in the generation of the variable-rate control signals in a closed-loop mode of operation. In addition, DPU 116 may store the feedback signals and correlated location signals in a geo-referenced feedback map associated with the particular field being worked. Thus, DPU 116 can produce geo-referenced digital maps representative of the actual amount of the farming input being applied which correspond to the correct field being worked.

Alternatively, separate boundary maps 600, 602 and 604 are not provided by memory card 114. Since the boundary data is not provided, DPU 116 determines the boundaries of fields A, B and C using the location data stored in geo-referenced application maps 700, 702 and 704. The location data may, for example, be used to calculate boundary data equivalent to the boundary data stored in maps 600, 602 and 604.

Another function which may be performed by site-specific farming system 100 includes sampling of site-specific characteristic data. For example, vehicle 516 may be a combine equipped with a header for harvesting grain. The combine supports flow sensor 152 and moisture content sensor 154. When the combine leaves barn 504, comparisons of the location signals to the boundary data show that the combine is not within the boundaries of any field. However, as the combine enters field B, comparisons of the location signals to boundary map 602 show that the combine has entered field B. DPU 116 stores sensed characteristic data such as yield and moisture content data and correlated location signals in a geo-referenced digital map associated with field B. By comparing the location signals to the boundary data and identifying the field being worked, DPU 116 insures that the sensed data is stored in the correct map. Thus, even if the combine were driven between fields A, B and C and used to harvest grain in each field, the resulting sensed data will be stored in association with the correct field.

The comparison of the location signals to the boundaries of each field, or to boundary information within the geo-referenced application maps, allows DPU 116 to identify the farm and field in which the vehicle is located. Thus, DPU 116 generates variable-rate control signals or stores sensed characteristic data for the particular field being worked without requiring the operator to manually select or identify the field.

Figure 8:
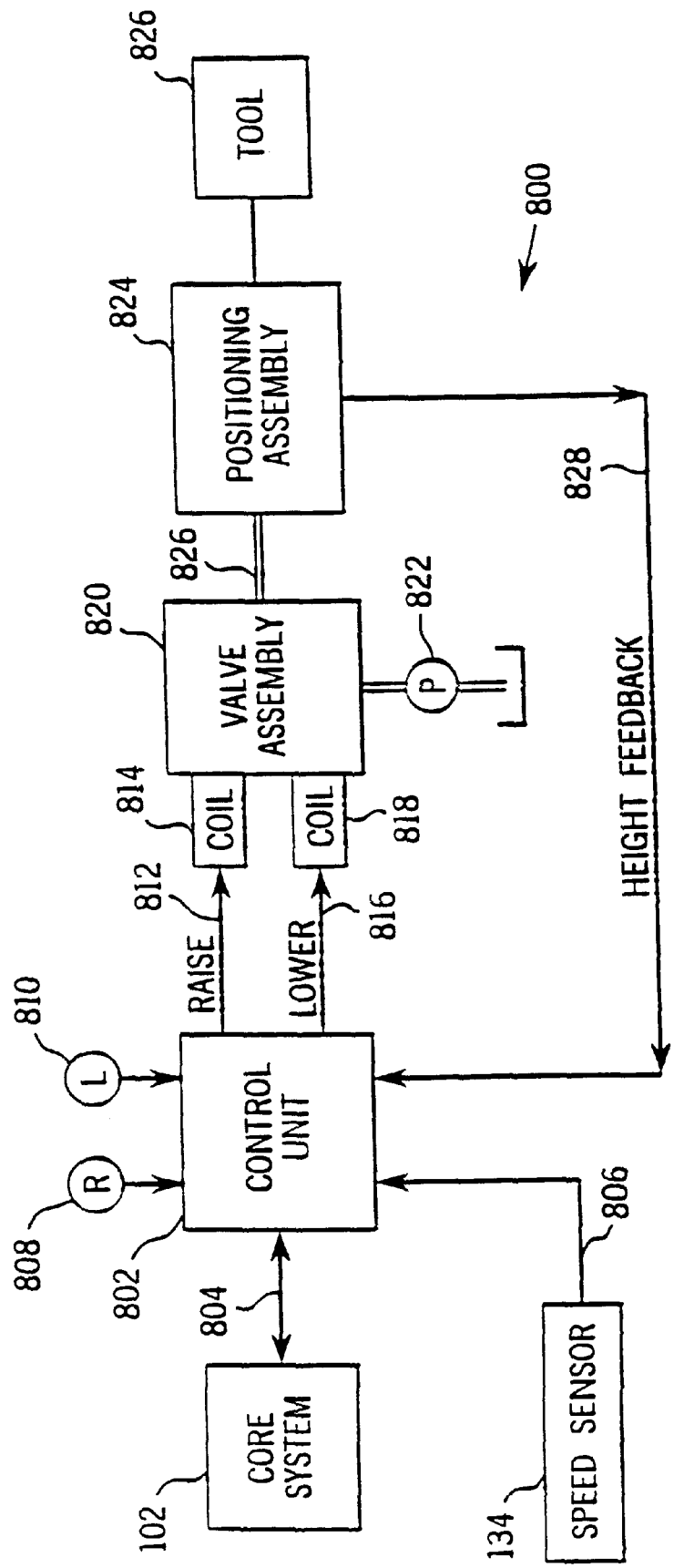
FIG. 8 is a block diagram illustrating a system for automatically controlling the height of an agricultural tool based upon whether an agricultural vehicle is without or within a field.

The field boundary data can also be used to automatically control the height or elevation of a tool as a vehicle repeatedly enters and exits a field at the borders or headlands of the field. Referring to FIG. 8, a control system 800 controls the height of an agricultural tool supported by a vehicle. In this embodiment, control system 800 is a hitch assembly or header assembly control system which includes an additional interface for receiving raise/lower information from core system 102. Alternatively, elements of core system 102 (e.g., location signal generation circuit 138; the interface for memory card 114) could be included in control system 800 and a separate core system 102 would not be needed.

Control system 800 includes a control unit 802 which communicates with core system 102 via link 804, which may be a discrete interface for carrying discrete signals or a communication interface (e.g., RS-232) for carrying additional data (e.g., location data, boundary data). Control unit 802 receives vehicle speed signals directly from speed sensor 134 via link 806, or indirectly from core system 102. Control unit 802 also receives raise and lower rate signals from a raise rate input device 808 and a lower rate input device 810, respectively. Devices 808 and 810 are, for example, potentiometers.

Control unit 802 generates height control signals including a raise control signal 812 applied to a raise coil 814 and a lower control signal 816 applied to a lower coil 818. Coils 814 and 818 are typically solenoids or relays, and control unit 802 may include a pulse-width-modulated (PWM) interface to generate PWM raise and lower control signals. Coils 814 and 818 control a valve assembly 820 configured to selectively apply pressurized hydraulic fluid from a pump 822 to a positioning assembly 824 via hydraulic fluid line 826. Positioning assembly 824 may include, for example, an hydraulic cylinder. Positioning assembly 824 raises an agricultural tool 826 in response to raise control signal 812 and lowers tool 826 in response to lower control signal 816. A height feedback sensor is coupled to positioning assembly 824 or tool 826 and is configured to generate a height feedback signal representative of the height of tool 826. Thus, control unit 802 can control the height of tool 826 in a closed-loop. Other input signals, such as draft force and position command signals (not shown) are also inputs to control unit 802 and are used to set a position command for tool 826.

In one embodiment, the vehicle is a tractor equipped with a hitch assembly control system, and tool 826 is an implement such as a plow which is raised and lowered by the hitch assembly. Further description of a tractor having a hitch assembly control system is provided in U.S. Pat. No. 5,421,416, commonly assigned and herein incorporated by reference. In another embodiment, the vehicle is a combine equipped with a positioning assembly, and tool 826 is a header which is raised and lowered by the positioning assembly. Further description of a combine provided with a header elevation control system is provided in U.S. Pat. No. 5,455,769, commonly assigned and herein incorporated by reference.

In operation, an operator typically actuates an input device such as a multiple-position switch to manually raise and lower tool 826 depending upon the relationship between the location of a vehicle and the boundaries of one or more fields. These actuations, however, increase the workload of the operator, and may result in tool 826 being raised or lowered too late or too early if the switch is manually actuated at the wrong time. To solve these problems, core system 102 transmits raise/lower command signals to control unit 802 via link 804 dependent upon comparisons between the location signals and the boundary data. For example, if the vehicle is a tractor equipped with a plow, core system 102 transmits a lower command signal when the location signals indicate that the tractor has entered a field and transmits a raise command signal when the location signals indicate that the tractor has exited the field.

Control unit 802 receives the raise and lower command signals and generates raise signal 812 in response to a raise command from core system 102, and generates lower signal 816 in response to a lower command. Thus, in the above example, the hitch is lowered to a working position when the tractor enters a field and is raised to a transport position when the tractor exits the field. The working position is typically set as a function of draft force or position command, and the transport position is typically a position where the plow does not come into contact with the ground. If the boundary data represents the boundaries of more than one field, core system 102 generates the raise and lower command signals based upon whether the vehicle is within or without any of the fields.

In one embodiment, control unit 802 reads the rate signals from rate input devices 808 and 810 and generates height control signals 812 and 816 to move tool 826 at a velocity dependent upon the rate signals. In another embodiment, lower control signal 816 is generated to move tool 826 from a transport to a working height as a function of the location signals, boundary data and rate signals such that the tool reaches the working height substantially when the vehicle reaches a field boundary. For example, control unit 802 may receive the location signals and boundary data from core system 102, and may estimate when the vehicle will reach the field boundary from this information. The estimation may account for vehicle speed determined by a time derivative of the location signals, and may also account for direction of the vehicle based upon a vector between adjacent location signals. The estimated time to reach the field boundaries and the rate signals determine the magnitude and timing of lower control signal 816.

In yet another embodiment, control unit 802 also uses speed signals from speed sensor 134 to generate lower control signal 816. For example, if the distance between the vehicle and the boundaries and the vehicle speed are known values, the time required for the vehicle to reach the boundary is equal to the distance divided by the speed. Height control signal 816 may be generated such that, at the velocity determined by the rate signals, tool 826 reaches the working position when the vehicle reaches the boundaries.

Similarly, control system 800 can be used to raise and lower tool 826 when a vehicle passes over a geographic attribute of a field. For example, control system 800 can raise a hitch when the vehicle approaches an obstruction, such as rock 520 (FIG. 5), and lower the hitch after the vehicle passes over the rock. The location of the obstruction is defined in a geo-referenced obstruction map. This action protects a plow attached to the hitch from being damaged by the rock.

The location of rock 520 is stored in a geo-referenced map of field C within memory circuit 114. The rock's location may be visually detected and stored during a scouting operation or while the field is being worked, or could be stored after the rock is hit by an implement such as a plow. Core system 102 transmits a raise command signal when the location signals indicate that the tractor is nearing rock 520 on a course which will take the vehicle over the location of the rock. Control unit 802 receives the raise command signal and generates raise signal 812 which, when applied to raise coil 814, causes the hitch to raise. The hitch is raised to a position which protects the plow from being damaged. This height may also be stored in the G.I.S. database. After the location signals indicate that the vehicle has passed over rock 520, core system 102 transmits a lower command signal. In response, control unit 802 generates lower signal 812 which, when applied to lower coil 818, causes the hitch to lower. The hitch is lowered back down to its working position.

The invention can be used to control any type of off-highway vehicle equipped with a tool. For example, the bucket of a wheeled or track-driven loader can be raised and lowered based upon the relationship between the location of the bucket and the location of an attribute in a field or construction site. Also, the blade of a dozer can be raised and lowered in view of a geo-referenced map.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims.

What is claimed is:

1. A system for controlling the height of an agricultural tool coupled to an agricultural vehicle, the tool being moveable by a positioning assembly configured to raise and lower the tool in response to height control signals, the system comprising:

a location signal generation circuit supported by the vehicle and configured to receive positioning signals and to generate location signals therefrom which are representative of the geographic location of the tool;

a memory circuit including geo-referenced attribute data representative of at least one attribute located in association with at least one agricultural field; and a control circuit coupled to the location signal generation circuit, the memory circuit and the positioning assembly, the control circuit configured to compare the location signals to the geo-referenced attribute data and to generate the height control signals to change the height of the tool based upon the relationship between the location of the tool and the location of the at least one attribute.

2. The system of claim 1, wherein the location signal generation circuit receives global positioning system (GPS) signals and generates the location signals therefrom.

3. The system of claim 2, wherein the location signal generation circuit also receives differential GPS (DGPS) signals and generates the location signals from the GPS and the DGPS signals.

4. The system of claim 3, wherein the memory circuit includes a removable memory card.

5. The system of claim 1, wherein the geo-referenced attribute data includes boundary data representative of the boundaries of the at least one field, and the height control signals raise and lower the tool based upon whether the location of the tool is within or without the at least one field.

6. The system of claim 5, wherein the height control signals move the tool to a transport height when the location of the tool is without the at least one field and move the tool to a working height when the location of the tool is within the at least one field.

7. The system of claim 6, wherein the boundary data includes first boundary data representative of the boundaries of a first field and second boundary data representative of the boundaries of a second field, and the control circuit compares the location signals to the first and the second boundary data to determine whether the location of the tool is within or without either the first or the second field.

8. The system of claim 1, wherein the geo-referenced attribute data includes obstruction data representative of the location of at least one obstruction in the at least one field, and the height control signals raise and lower the tool based upon the relationship between the location of the tool and the location of the at least one obstruction.

9. The system of claim 8, wherein the height control signals move the tool to a height above the obstruction when the tool is over the at least one obstruction.

10. The system of claim 9, wherein the obstruction data includes first obstruction data representative of the location of at least one obstruction in a first field and second obstruction data representative of the location of at least one obstruction in a second field, and the control circuit compares the location signals to the first and the second obstruction data to determine whether the location of the tool is over either the at least one obstruction in the first or the second field.

11. A system for controlling the height of an agricultural tool coupled to an agricultural vehicle, the tool being moveable by a positioning assembly configured to raise and lower the tool in response to height control signals, the system comprising:

a location signal generation circuit supported by the vehicle and configured to receive positioning signals and to generate location signals therefrom which are representative of the geographic location of the tool;

a memory circuit including geo-referenced boundary data representative of the boundaries of at least one agricultural field; and a control circuit coupled to the location signal generation circuit, the memory circuit and the positioning assembly, the control circuit configured to compare the location signals to the geo-referenced boundary data and to generate the height control signals to change the height of the tool based upon the relationship between the location of the tool and the boundaries of the at least one field.

12. The system of claim 11, wherein the location signal generation circuit receives global positioning system (GPS) signals and generates the location signals therefrom.

13. The system of claim 12, wherein the location signal generation circuit also receives differential GPS (DGPS) signals and generates the location signals from the GPS and the DGPS signals.

14. The system of claim 13, wherein the memory circuit includes a removable memory card.

15. The system of claim 11, wherein the height control signals move the tool between a transport height and a working height based upon whether the location of the tool is within or without the at least one field.

16. The system of claim 11, wherein the geo-referenced boundary data includes first boundary data representative of the boundaries of a first field and second boundary data representative of the boundaries of a second field, and the control circuit compares the location signals to the first and the second boundary data to determine the relationship between the location of the tool and the boundaries of the first and the second field.

17. The system of claim 16, wherein the height control signals move the tool between a transport height and a working height based upon whether the location of the tool is within or without either the first or the second field.

18. The system of claim 11, further comprising a height sensor coupled to the control circuit and configured to detect the height of the tool and to generate height feedback signals representative thereof, and the control circuit is further configured to generate the height control signals in a closed loop using the height feedback signals.

19. The system of claim 18, further comprising a user interface coupled to the control circuit and configured to generate a rate signal, and the control circuit is further configured to generate the height control signals to move the tool at a velocity dependent upon the rate signal.

20. The system of claim 19, wherein the control circuit is further configured to generate the height control signals to start the movement of the tool from a transport height to a working height before the location of the tool reaches the boundaries of the at least one field, and the tool reaches the working height substantially when the vehicle reaches the boundaries of the at least one field.

21. The system of claim 20, wherein the height control signals are based at least upon the location signals, the boundary data and the rate signal.

22. The system of claim 21, further comprising a speed sensor coupled to the control circuit and configured to sense vehicle speed and to generate speed signals representative thereof, and the control circuit is further configured to generate the height control signals based upon the speed signals.

23. A system for controlling the height of an agricultural tool, the system comprising:

an agricultural vehicle;

a positioning assembly supported by the vehicle and configured to raise and lower the tool in response to height control signals;

a location signal generation circuit supported by the vehicle and configured to receive positioning signals and to generate location signals therefrom which are representative of the geographic location of the tool;

a memory circuit including geo-referenced attribute data representative of at least one attribute located in association with at least one agricultural field; and a control circuit coupled to the location signal generation circuit, the memory circuit and the positioning assembly, the control circuit configured to compare the location signals to the geo-referenced attribute data and to generate the height control signals to change the height of the tool based upon the relationship between the location of the tool and the location of the at least one attribute.

24. The system of claim 23, wherein the agricultural vehicle is a tractor and the positioning assembly is a hitch assembly configured to raise and lower an implement.

25. The system of claim 23, wherein the agricultural vehicle is a combine and the positioning assembly is configured to raise and lower a header.

26. The system of claim 23, wherein the geo-referenced attribute data includes boundary data representative of the boundaries of the at least one field, and the height control signals raise and lower the tool based upon whether the location of the tool is within or without the at least one field.

27. The system of claim 23, wherein the geo-referenced attribute data includes obstruction data representative of the location of at least one obstruction in the at least one field, and the height control signals raise and lower the tool based upon the relationship between the location of the tool and the location of the at least one obstruction.

* * * * *